United States Patent
Li et al.

(10) Patent No.: US 11,847,349 B2
(45) Date of Patent: Dec. 19, 2023

(54) DYNAMIC PARTITION COMMAND QUEUES FOR A MEMORY DEVICE

(71) Applicant: Micron Technology, Inc., Boise, ID (US)

(72) Inventors: Juane Li, Milpitas, CA (US); Fangfang Zhu, San Jose, CA (US); Jason Duong, San Jose, CA (US); Chih-Kuo Kao, Fremont, CA (US); Jiangli Zhu, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 204 days.

(21) Appl. No.: 17/445,474

(22) Filed: Aug. 19, 2021

(65) Prior Publication Data
US 2023/0056287 A1    Feb. 23, 2023

(51) Int. Cl.
*G06F 3/06* (2006.01)

(52) U.S. Cl.
CPC .......... *G06F 3/0659* (2013.01); *G06F 3/0604* (2013.01); *G06F 3/0644* (2013.01); *G06F 3/0679* (2013.01)

(58) Field of Classification Search
CPC .... G06F 3/0604; G06F 3/0644; G06F 3/0659; G06F 3/0679
See application file for complete search history.

(56) References Cited

U.S. PATENT DOCUMENTS

| | | | | |
|---|---|---|---|---|
| 7,472,237 B1 * | 12/2008 | Herbst | .................. | H04L 69/161 711/152 |
| 2015/0186068 A1 * | 7/2015 | Benisty | ................. | G06F 3/0673 711/154 |

* cited by examiner

*Primary Examiner* — Larry T Mackall
(74) *Attorney, Agent, or Firm* — Lowenstein Sandler LLP

(57) ABSTRACT

A partition command is stored at free memory address location of the local memory corresponding to an index of an address array. The index is associated with an entry in the address array. A last entry in a linked list of entries from a tail register is obtained based on an allocation of the stored partition command to a partition command queue of a plurality of partition command queues. The tail register corresponds to the partition command queue of the plurality of partition command queues. Responsive to obtaining the last entry in the linked list, an entry to the linked list after the last entry is appended. The entry corresponds to the index of the address array associated with the stored partition command.

20 Claims, 5 Drawing Sheets

300

Store, at a free memory address location of a local memory corresponding to an index of an address array, a partition command, wherein each index is associated with an entry in the address array. 310

↓

Obtain, based on an allocation of the stored partition command to a partition command queue of a plurality of partition command queues, a last entry in a linked list of entries from a tail register, wherein the tail register corresponds to the partition command queue of the plurality of partition command queues. 320

↓

Responsive to obtaining the last entry in the linked list, append an entry to the linked list after the last entry, the entry corresponding to the index of the address array associated with the stored partition command. 330

300 

Store, at a free memory address location of a local memory corresponding to an index of an address array, a partition command, wherein each index is associated with an entry in the address array. 310

Obtain, based on an allocation of the stored partition command to a partition command queue of a plurality of partition command queues, a last entry in a linked list of entries from a tail register, wherein the tail register corresponds to the partition command queue of the plurality of partition command queues. 320

Responsive to obtaining the last entry in the linked list, append an entry to the linked list after the last entry, the entry corresponding to the index of the address array associated with the stored partition command. 330

FIG. 3

400 
Receive, from a requestor, a first partition command. 410
Update a tail register of a partition command queue of a plurality of partition command queues based on the received partition command, wherein each partition command queue of the plurality of partition command queues is a linked list of address array entries. 420
FIG. 4

DYNAMIC PARTITION COMMAND QUEUES FOR A MEMORY DEVICE

TECHNICAL FIELD

Embodiments of the disclosure relate generally to memory sub-systems, and more specifically, relate to dynamic partition command queues for a memory device.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3 is a flow diagram of an example method to dynamically adjust partition command queues for a memory device in accordance with some embodiments of the present disclosure.

FIG. 4 is a flow diagram of an example method to dynamically adjust partition command queues for a memory device in accordance with some embodiments of the present disclosure.

DETAILED DESCRIPTION

Figure 1:
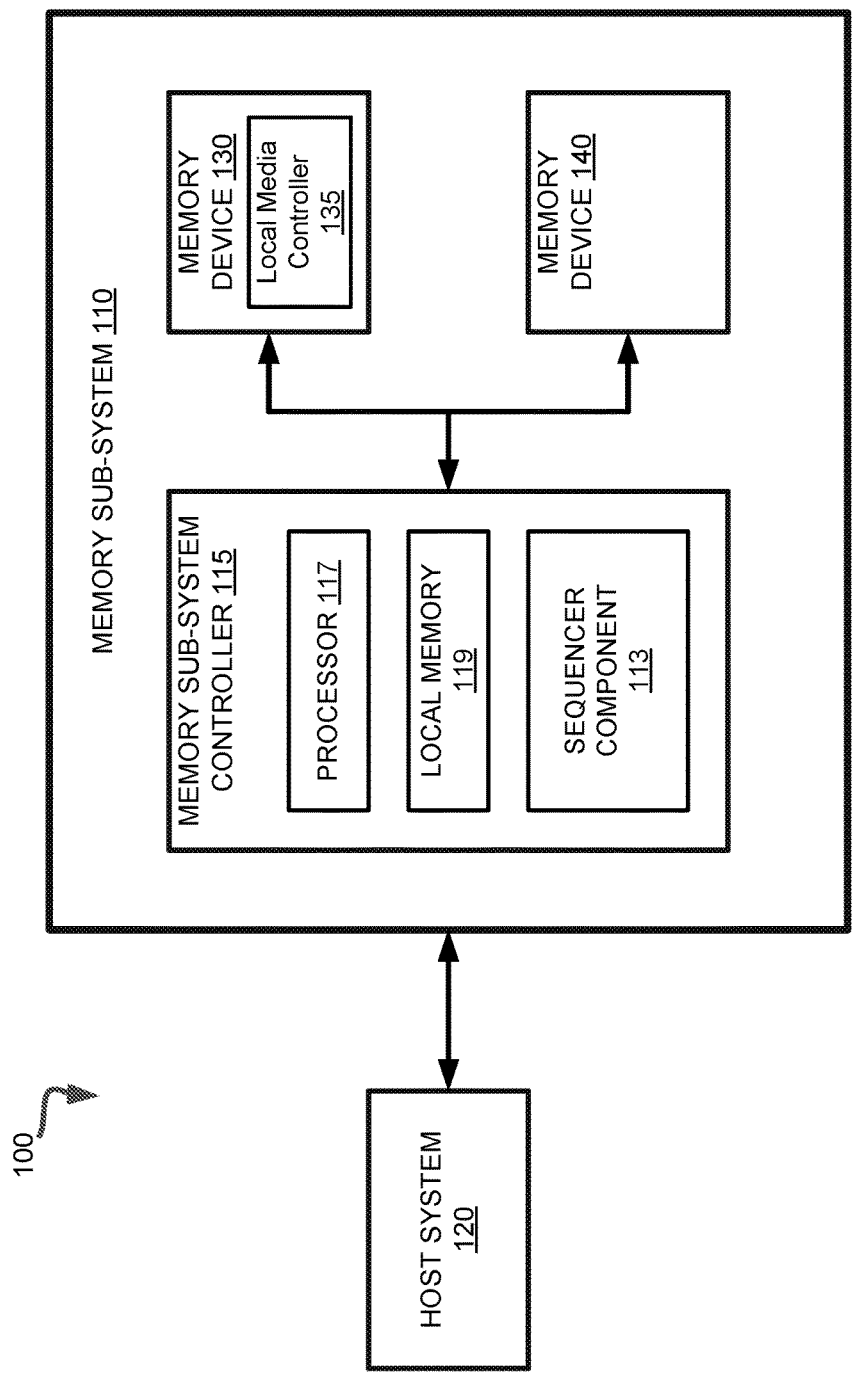
FIG. 1 illustrates an example computing system that includes a memory sub-system in accordance with some embodiments of the present disclosure.

Aspects of the present disclosure are directed to dynamic partition command queues for a memory device. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array.

Other examples of non-volatile memory devices are described below in conjunction with FIG. 1. A non-volatile memory device is a package of one or more dies. Each die can consist of one or more partitions. Each partition consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

The memory sub-system can include a controller that performs various operations at particular memory device of the memory sub-system. For example, the controller can perform a read operation, write operation, or an erase operation at one or more of the memory devices. The controller can include multiple channels that are used to control the one or more of the memory devices. Each channel can correspond to a portion of the controller and interface components that are used to communicate with and perform operations at a respective memory device. For example, a first channel can be used to perform operations at a first memory device and a second channel can be used to perform operations at a second memory device. As such, different channels of the controller can access different memory devices of the memory sub-system.

In a conventional memory sub-system, a controller can include a sequencer component that is used to facilitate the performance of operations at the one or more of the memory devices through the different channels. The sequencer component can receive an operation that is to be performed at the memory sub-system and can further receive data corresponding to the operation when the operation corresponds to a write operation. For example, the sequencer component can separate the operation into sub-operations that are to be performed at different memory devices through different channels. As such, the sequencer component can determine the sub-operations for various memory devices at the channels of the controller when an operation is received by the memory sub-system.

The sequencer component of a conventional memory sub-system can determine the partition commands for a single die command at a particular time. For example, a single die command to be performed by the memory sub-system can be received and corresponding partition commands can be determined for each respective memory device from which data is to be read or erased or to which data is to be written. After the partition commands have been determined, the sequencer component can determine operations for particular memory devices. The controller can use the sequencer component to operate on memory devices in a synchronous manner. For example, the controller can use the resulting command of the partition command from the sequencer component to perform a particular type of command (e.g., a read command, write command, or erase command) at memory devices at a particular time and cannot perform another type of command at the same time. Accordingly, conventional memory sub-system must perform the commands on the memory devices in a synchronous manner causing constant switching between different types of commands (e.g., command types) based on a particular time at which the commands are to be performed.

Aspects of the present disclosure address the above and other deficiencies by providing a memory sub-system that includes one or more sets of dynamic partition command queues in which each set of dynamic partition command queues are populated based on the type of partition commands (e.g., a read command or write command) to optimize data throughput (e.g., GiB/s).

Advantages of the present disclosure include, but are not limited to, providing a partition command queue that dynamically adjusts to avoid back pressure on other components when attempting to store a partition command in a fixed partition command queue that is full (i.e. unable to populate a partition command queue of the plurality of queues and causing retention of the command within the controller).

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a sequencer component 113 that can dynamically adjust one or more partition command queues of a plurality of partition command queues to store partition commands and avoid back pressure of the partition command to the media controller. In some embodiments, the memory sub-system controller 115 includes at least a portion of the sequencer component 113. In some embodiments, the sequencer component 113 is part of the host system 110, an application, or an operating system. In other embodiments, local media controller 135 includes at least a portion of sequencer component 113 and is configured to perform the functionality described herein.

The sequencer component 113 can receive a die command directed to one or more of the memory devices and stores each received die command into a die command queue. The sequencer component 113 can partition each die command in the die command queue into a plurality of partition commands. The sequencer component 113 can direct the plurality of partition commands into one of a plurality of partition command queues based on the command of partition commands (e.g., read command or write command) to populate each partition command queue of the plurality of partition command queues. To populate the plurality of partition command queues, the sequencer component 113 can store the received partition command in a free address of a partition command storage. Each address of the partition command storage corresponds to an index of an address array. Each partition command queue of the plurality of partition command queues refers to a linked list of partition commands. Each partition command of the linked list is stored in the partition command storage in which each address in the partition command storage corresponds to an index of an address array.

Based on the received partition command, the sequencer component 113 can append the partition command to the linked list associated with the partition command queue by modifying the entry in the address array. Each entry in the address array comprises an address in the partition command storage that corresponds to the next partition command in the linked list. Responsive to appending the received partition command to the linked list associated with the partition command queue, the sequencer component 113 can update a tail register with the index of the address array corresponding to the address of the partition command storage corresponding to the received partition command. Each the partition command queue of the plurality of command queues comprises a tail register and a header register. The header register stores the first partition command of the linked list associated with the partition command queue of the plurality of command queues.

The sequencer component 113 can issue a partition command from one of the partition command queues of the plurality partition command queues to a command processor of the sequencer component 113 to be applied to a memory device 130, 140. Responsive to issuing the partition command from one of the partition command queue of the plurality partition command queues, the sequencer component 113 can update the header register with the next partition command in the linked list corresponding to partition command queue of the plurality partition command queues and remove the partition command from the partition command storage. Further details with regards to the operations of the sequencer component 113 are described below.

Figure 2:
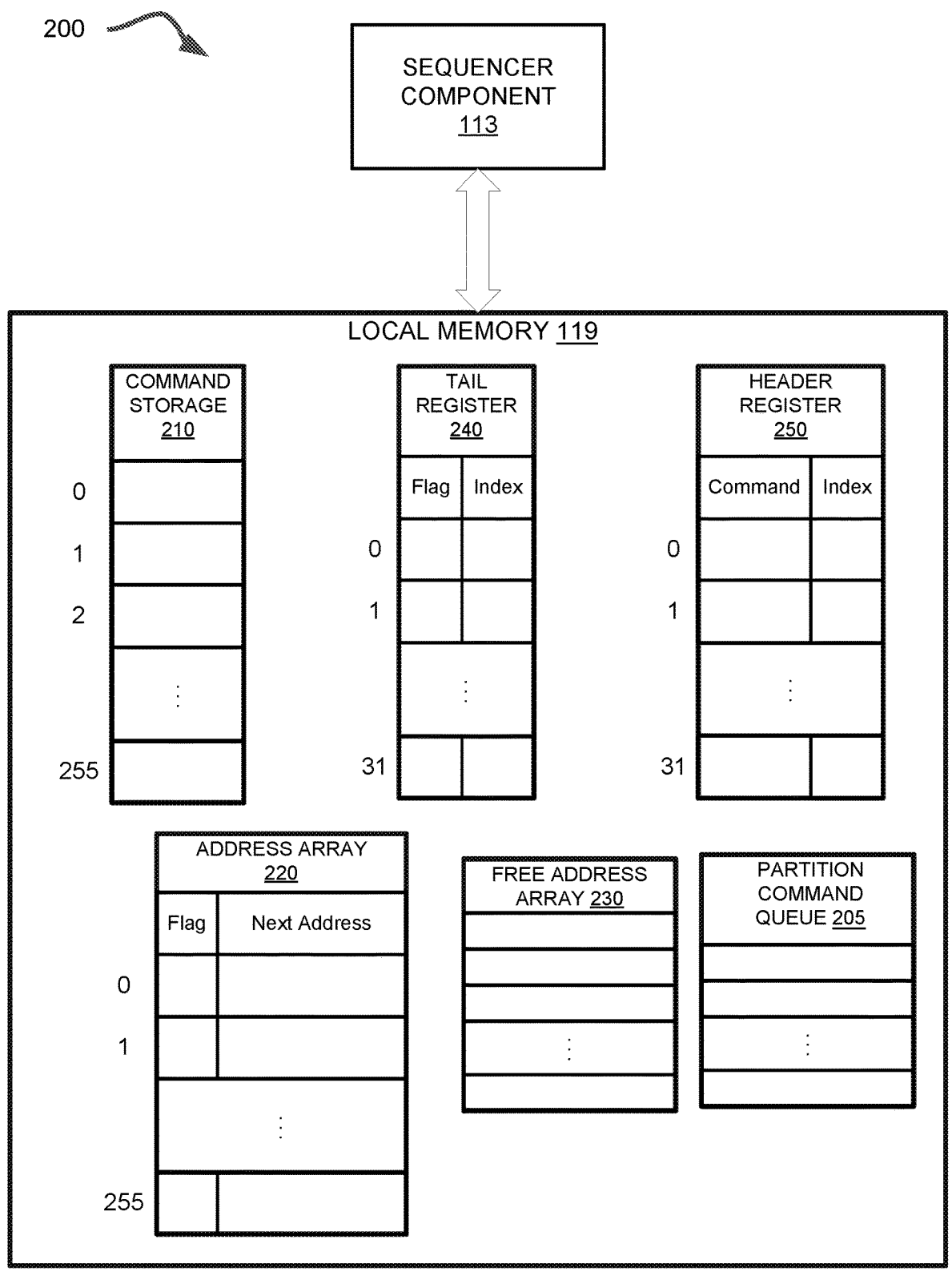
FIG. 2 is a block diagram illustrating dynamically adjusting partition command queues for a memory device in accordance with some embodiments of the present disclosure.

FIG. 2 is a block diagram 200 illustrating the sequencer component 113 operatively coupled with local memory 119 to facilitate dynamically adjusting partition command queues for a memory device in accordance with some embodiments of the present disclosure. Depending on the embodiment, local memory 119 includes a command storage 210, an address array 220, a free address array index 230, a tail register 240, and a header register 250.

Command storage 210 stores partition commands determined by the sequencer component 113. Command storage is configured to store a predetermined number of partition commands (e.g., 256 address locations or memory address locations) and each partition command can include an error code correction (ECC) bit to facilitate error-correcting code (ECC) operations. Accordingly, each entry of the command storage can support the size of each partition command and ECC bit.

Address array 220 represents a data structure consisting of a predetermined collection of elements or entries (e.g. 256 elements or entries) each identified by an array index (e.g., index). Each index of the address array 220 corresponds to an address location of the command storage (e.g., address location 1 of command storage 210 corresponds to index 1 of the address array 220). Each element of the address array 220 comprises an address array flag and a next address. The next address of the address array 220 comprises an address location of the next partition command in the linked list. The address array flag may be set to a logical "1" which represents that the next address of the address array 220 is a valid entry in the linked list. The address array flag may be set to a logical "0" which represents that the next address of the address array 220 is not a valid entry in the linked list and may be updated upon receiving a new partition command.

Free address array index 230 (e.g., free memory address location) represents a list of index corresponding to each element of the address array 220 with the address array flag set to a logical "0" indicating that the element of the address array 220 associated with the index can be used to append a partition command to the linked list. To append the partition command to the linked list, the sequencer component 113 updates the address array flag (e.g., set to logical "1") and next address of the address array 220 (e.g., with the address location of the partition command) at the index of the address array corresponding to the last entry in the linked list. To remove the partition command from the linked list, the sequencer component 113 updates the address array flag (e.g., set to logical "0") at the index of the address array corresponding to the last entry in the linked list. Based on setting the address array flag to logical "0" the data stored in the next address of the address array 220 is not read.

The sequencer component 113 comprises a predetermined number of partition command queues 205 (e.g., 32 partition command queues). Each partition command queue of the partition command queues 205 correspond to a tail register 240 and header register 250. The tail register 240 and the header register 250 stores data corresponding to each partition command queue. Accordingly, for example, the tail register 240 and the header register 250 may each contain 32 register entries corresponding to the 32 partition command queues 205.

Each register entry of the tail register 240 represents the last entry in the respective partition command queue and comprises a tail register flag and a tail register index. The tail register flag may be set to a logical "1" which represents that the linked list associated with the corresponding partition command queue contains at least one entry in the linked list. The tail register flag may be set to a logical "0" which represents that the linked list associated with the corresponding partition command queue contains no entries in the linked list. The tail register index represents the index of the address array which corresponds to the address location of the command storage that contains the partition command associated with the last entry of the linked list. The tail register 240 maintains the tail register index to provide the sequencer component 113 access to the address array 220 by using the tail register index to query the address array 220 and the partition command by using the tail register index to query the command storage 210. Based on setting the tail register flag to logical "0" the tail register index of the tail register is not read due to there being no partition commands in the respective partition command queue.

Each register entry of the header register 250 represents the first entry in the respective partition command queue and comprises a partition command corresponding to the first entry and a header index. The partition command of the header register stores the partition command from the command storage in the partition command of the header register 250 to facilitate more efficient access to the first partition command of the partition command queue. The header index corresponds to the index of the address array 220 and subsequently the address location of the command storage 210 of the first entry in the respective partition command queue. The header register 250 maintains the header index to provide the sequencer component 113 access to the next address in the partition command queue (e.g., linked list) by using the header index to query the address array 220.

FIG. 3 is a flow diagram of an example method 300 to dynamically adjust partition command queues for a memory device, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the sequencer component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic stores, at a free memory address location of a local memory corresponding to an index of an address array, a partition command, wherein each index is associated with an entry in the address array. To store the partition command, the processing logic receives a free memory address location of the local memory from a plurality of free memory address locations and the partition command from a requestor. Once the free memory address location of the local memory and the partition command are received, the processing logic writes the partition command to the free memory address location of the local memory.

At operation 320, the processing logic obtains, based on an allocation of the stored partition command to a partition command queue of a plurality of partition command queues, a last entry in a linked list of entries from a tail register, wherein the tail register corresponds to the partition command queue of the plurality of partition command queues. To obtain the last entry in the linked list of entries from the tail register, the processing logic determines if a valid tail tag (e.g., tail register flag) of the tail register corresponding to the partition command queue of the plurality of partition command queues is set to a first logical value (e.g., "1"), queries an entry from the address array using the tail index of the tail register (e.g., tail register index) as the index of the address array, and returning the queried entry as the last entry.

At operation 330, the processing logic responsive to obtaining the last entry in the linked list, appends an entry to the linked list after the last entry, the entry corresponding to the index of the address array associated with the stored partition command. To append the partition command to the linked list, the processing logic updates a next address of the queried entry with the index of the address array associated with the stored partition command.

In some embodiments, the processing logic issues a partition command stored in a header register to a command processor of the sequencer component to be applied to a memory device, wherein the header register corresponds to one of the plurality of partition command queues. To issue the partition command stored in the header register, the processing logic queries an entry from the address array using a header index of the header register as the index of the address array. Depending on the embodiment, after issuing the partition command to the command processor, the processing logic sends the header index of the header register to a plurality of free memory address locations. Depending on the embodiment, after issuing the partition command stored in the header register, the processing logic queries an entry from the address array based on a header index of the header register used as the index of the address array, obtains a next address from the queried entry, and updates the header index with the next address and a data portion of the header register (e.g., partition command of the header register) with a partition command from the local memory from an index corresponding to the next address from the queried entry.

In yet another embodiment, responsive to not obtaining the last entry in the linked list of entries from the tail register, the processing logic updates, based on the allocation of the stored partition command to the partition command queue of the plurality of partition command queues, a data portion of a header register (e.g., partition command of the header register) corresponding to the partition command queue with the stored partition command and a header index of the header register with the index of the address array corresponding to the stored partition command. Once the header index is updated, the processing logic updates a tail index of the tail register with the index of the address array corresponding to the stored partition command and a valid tail tag (e.g., tail register flag) of the tail register to a first logical value (e.g., "1").

FIG. 4 is a flow diagram of an example method 400 to dynamically adjust partition command queues for a memory device, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the sequencer component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic receives, from a requestor, a first partition command. To receive the first partition command, the processing logic requests a free address array index entry of address array entries, obtains the last address array entry in the linked list, updates a next address of the last address array entry with an index associated with the free address array index entry, and allocates the first partition command to free address array index entry.

At operation 420, the processing logic updates a tail register of a partition command queue of a plurality of partition command queues based on the received partition command, wherein each partition command queue of the plurality of partition command queues is a linked list of address array entries. To update the tail register of the partition command queue of the plurality of partition command queues based on the first partition command, the processing logic updates a valid tail flag (e.g., tail register flag) and updates a tail index with the index associated with the free address array index entry.

Figure 5:
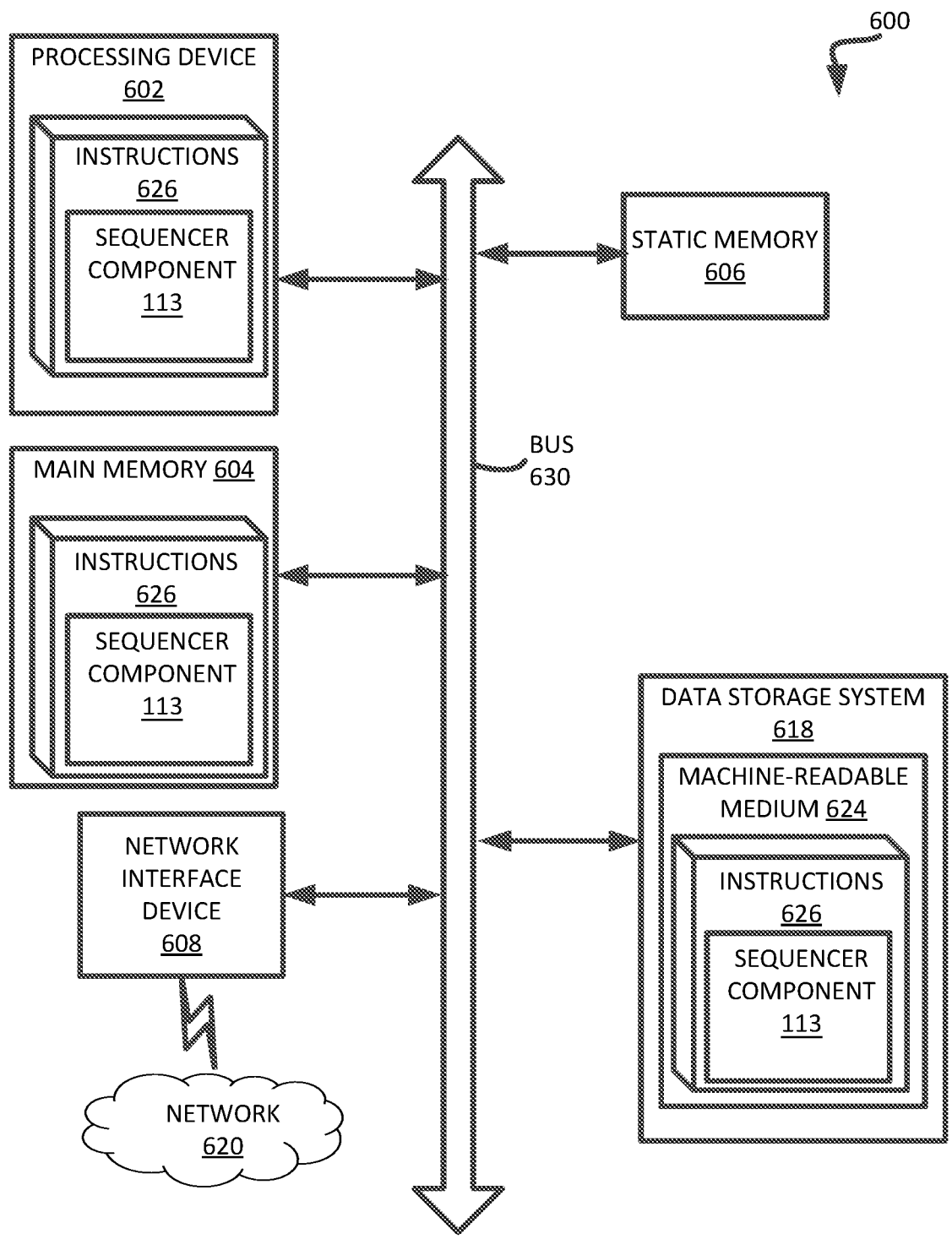
FIG. 5 is a block diagram of an example computer system in which embodiments of the present disclosure may operate.

In some embodiments, issuing a second partition from a header register of a partition command queue of the plurality of partition command queues to a command processor of a sequencer component to be applied to a memory device; updating the header register based on a next address array entry in the linked list associated with the partition command queue FIG. 5 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the sequencer component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a dynamic queue component (e.g., the sequencer component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a local memory;
   a sequencer component, operatively coupled to the local memory, the sequencer component to perform operations comprising:

storing, at a free memory address location of the local memory corresponding to an index of an address array, a partition command, wherein the index is associated with an entry in the address array;

determining, based on an allocation of the stored partition command to a partition command queue of a plurality of partition command queues, if a valid tail tag of a tail register corresponding to the partition command queue of the plurality of partition command queues is set to a first logical value;

responsive to determining that the valid tail tag of the tail register is set to the first logical value, querying an entry from the address array based on a tail index of the tail register corresponding to the valid tail tag used as the index of the address array; and appending an entry to a linked list of entries after the queried entry, the entry corresponding to the index of the address array associated with the stored partition command.

2. The system of claim 1, wherein storing the partition command comprises receiving a free memory address location of the local memory from a plurality of free memory address locations, receiving the partition command from a requestor, and writing the partition command to the free memory address location of the local memory.

3. The system of claim 1, wherein appending to the linked list the entry corresponding to the index of the address array associated with the stored partition command comprises updating a next address of the entry with the index of the address array associated with the stored partition command.

4. The system of claim 1, wherein the sequencer component is to perform operations further comprising:
issuing a partition command stored in a header register to a command processor of the sequencer component to be applied to a memory device, wherein the header register corresponds to one of the plurality of partition command queues.

5. The system of claim 4, wherein issuing the partition command stored in the header register comprises querying an entry from the address array based on a header index of the header register used as the index of the address array and sending the header index of the header register to a plurality of free memory address locations.

6. The system of claim 4, wherein issuing the partition command stored in the header register comprise querying an entry from the address array based on a header index of the header register used as the index of the address array, obtaining a next address from the queried entry, and updating the header index with the next address and a data portion of the header register with a partition command from the local memory at an index corresponding to the next address from the queried entry.

7. The system of claim 1, wherein the sequencer component is to perform operations further comprising:
responsive to determining that the valid tail tag of the tail register corresponding to the partition command queue is not set to the first logical value,
updating a data portion of a header register corresponding to the partition command queue with the stored partition command and a header index of the header register with the index of the address array corresponding to the stored partition command; and
updating a tail index of the tail register with the index of the address array corresponding to the stored partition command and the valid tail tag of the tail register to the first logical value.

8. A method comprising:
storing, at a free memory address location of a local memory corresponding to an index of an address array, a partition command, wherein each index is associated with an entry in the address array;

determining, based on an allocation of the stored partition command to a partition command queue of a plurality of partition command queues, if a valid tail tag of a tail register corresponding to the partition command queue of the plurality of partition command queues is set to a first logical value;

responsive to determining that the valid tail tag of the tail register is set to the first logical value, querying an entry from the address array based on a tail index of the tail register corresponding to the valid tail tag used as the index of the address array; and appending an entry to a linked list of entries after the queried entry, the entry corresponding to the index of the address array associated with the stored partition command.

9. The method of claim 8, wherein storing the partition command comprises receiving the free memory address location of the local memory from a plurality of free memory address locations, receiving the partition command from a requestor, and writing the partition command to the free memory address location of the local memory.

10. The method of claim 8, wherein appending to the linked list the entry corresponding to the index of the address array associated with the stored partition command comprises updating a next address of the entry with the index of the of the address array associated with the stored partition command.

11. The method of claim 8, further comprising:
issuing a partition command stored in a header register to a command processor of a sequencer component to be applied to a memory device, wherein the header register corresponds to one of the partition command queues.

12. The method of claim 11, wherein issuing the partition command stored in the header register comprises querying an entry from the address array based on a header index of the header register used as the index of the address array and sending the header index of the header register to a plurality of free memory address locations.

13. The method of claim 11, wherein issuing the partition command stored in the header register comprises querying an entry from the address array based on a header index of the header register used as the index of the address array, obtaining a next address from the queried entry, and updating the header index with the next address and a data portion of the header register with a partition command from the local memory at an index corresponding to the next address from the queried entry.

14. The method of claim 8, further comprising:
responsive to determining that the valid tail tag of the tail register corresponding to the partition command queue is not set to the first logical value,
updating a data portion of a header register corresponding to the partition command queue with the stored partition command and a header index of the header register with the index of the address array corresponding to the stored partition command; and
updating a tail index of the tail register with the index of the address array corresponding to the stored partition command and the valid tail tag of the tail register to the first logical value.

15. A non-transitory computer-readable storage medium comprising instruction that, when executed by a processing device, cause the processing device to perform operations comprising:

storing, at a free memory address location of a local memory corresponding to an index of an address array, a partition command, wherein each index is associated with an entry in the address array;

determining, based on an allocation of the stored partition command to a partition command queue of a plurality of partition command queues, if a valid tail tag of a tail register corresponding to the partition command queue of the plurality of partition command queues is set to a first logical value;

responsive to determining that the valid tail tag of the tail register is set to the first logical value, querying an entry from the address array based on a tail index of the tail register corresponding to the valid tail tag used as the index of the address array; and appending an entry to a linked list of entries after the queried entry, the entry corresponding to the index of the address array associated with the stored partition command.

16. The non-transitory computer-readable storage medium of claim 15, wherein storing the partition command comprises receiving the free memory address location of the local memory from a plurality of free memory address locations, receiving the partition command from a requestor, and writing the partition command to the free memory address location of the local memory.

17. The non-transitory computer-readable storage medium of claim 15, wherein appending to the linked list the entry corresponding to the index of the address array associated with the stored partition command comprises updating a next address of the entry with the index of the of the address array associated with the stored partition command.

18. The non-transitory computer-readable storage medium of claim 15, further comprising:

issuing a partition command stored in a header register to a command processor of a sequencer component to be applied to a memory device, wherein the header register corresponds to one of the partition command queues.

19. The non-transitory computer-readable storage medium of claim 18, wherein issuing the partition command stored in the header register comprises querying an entry from the address array based on a header index of the header register used as the index of the address array and sending the header index of the header register to a plurality of free memory address locations.

20. The non-transitory computer-readable storage medium of claim 15, further comprising:

responsive to determining that the valid tail tag of the tail register corresponding to the partition command queue is not set to the first logical value, updating a data portion of a header register corresponding to the partition command queue with the stored partition command and a header index of the header register with the index of the address array corresponding to the stored partition command; and updating a tail index of the tail register with the index of the address array corresponding to the stored partition command and the valid tail tag of the tail register to the first logical value.

\* \* \* \* \*